(No Model.)  
6 Sheets—Sheet 1.

D. HEPP.
WORKMAN'S TIME RECORDER.

No. 554,123.  
Patented Feb. 4, 1896.

WITNESSES:  
INVENTOR  
Daniel Hepp  
BY  
ATTORNEYS (No Model.)
6 Sheets—Sheet 4.

D. HEPP.
WORKMAN'S TIME RECORDER.

No. 554,123. Patented Feb. 4, 1896.

WITNESSES:

INVENTOR
Daniel Hepp
BY
ATTORNEYS (No Model.)  6 Sheets—Sheet 5.

D. HEPP.
WORKMAN'S TIME RECORDER.

No. 554,123. Patented Feb. 4, 1896.

Fig. 5ª

Figure 5:
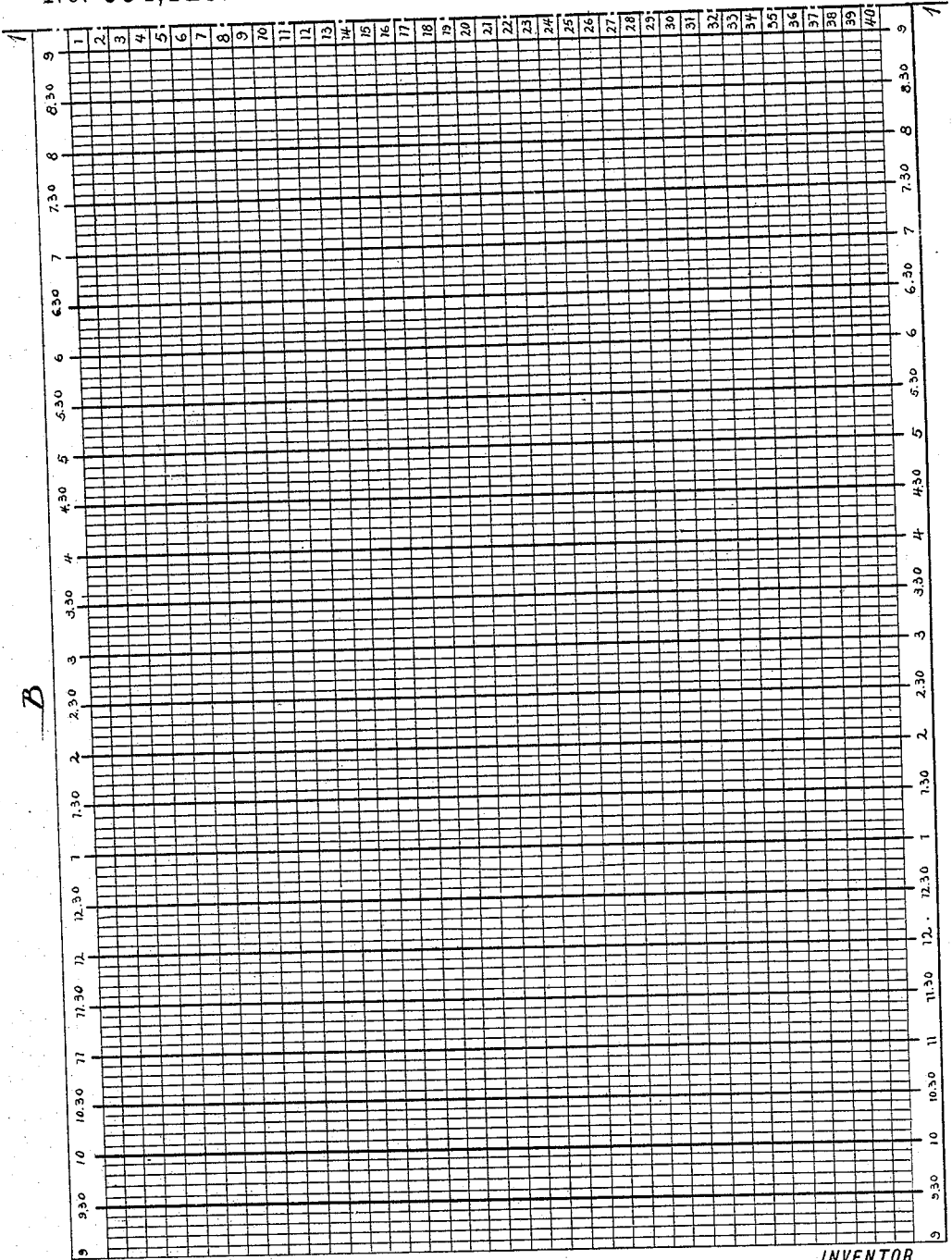

WITNESSES:  
INVENTOR  
Daniel Hepp  
BY  
ATTORNEYS (No Model.)  6 Sheets—Sheet 6.
D. HEPP.
WORKMAN'S TIME RECORDER.
No. 554,123. Patented Feb. 4, 1896.
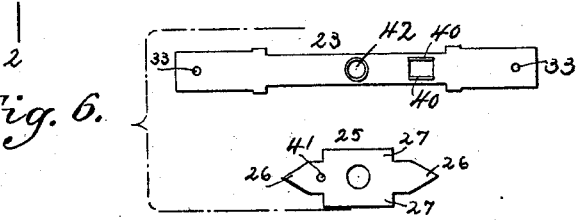
Fig. 5.b
| NAME | S | M | T | W | T | F | S | No. of HOURS | OS. of WEEK | TOTAL HOURS | RATE PER HOUR | AMOUNT | REMARKS |
|------|---|---|---|---|---|---|---|-------------|-------------|-------------|---------------|--------|---------|
Fig. 6.
Fig. 7.
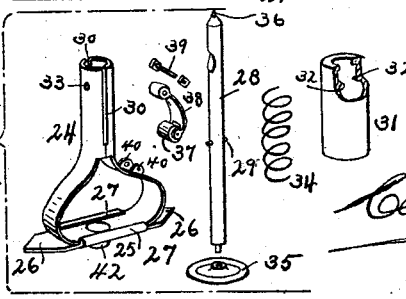
WITNESSES:
INVENTOR
Daniel Hepp
BY
Clark Deemer & Co.
ATTORNEYS

UNITED STATES PATENT OFFICE.

DANIEL HEPP, OF CHICAGO, ILLINOIS.

WORKMAN'S TIME-RECORDER.

SPECIFICATION forming part of Letters Patent No. 554,123, dated February 4, 1896.

Application filed June 4, 1895. Serial No. 551,606. (No model.)

*To all whom it may concern:*

Be it known that I, DANIEL HEPP, a citizen of the United States, and a resident of Chicago, in the county of Cook and State of Illinois, have invented a certain new and useful Workman's Time-Recorder, of which the following is a specification, reference being had to the accompanying drawings, forming a part thereof, in which similar letters of reference indicate corresponding parts.

This invention relates to improvements in time-recorders, and has for its object to produce an article of this character with an improved mechanism adapted to accurately record the time of the arrival and departure of a number of employés to and from a given place, the record to be made on a single sheet of paper which will last for several consecutive days.

A further object is to produce a time-recording mechanism which may be cheaply and compactly constructed and which can be easily and effectually operated by inexperienced persons.

The invention will be hereinafter fully described and specifically set forth in the claims.

Figure 1:
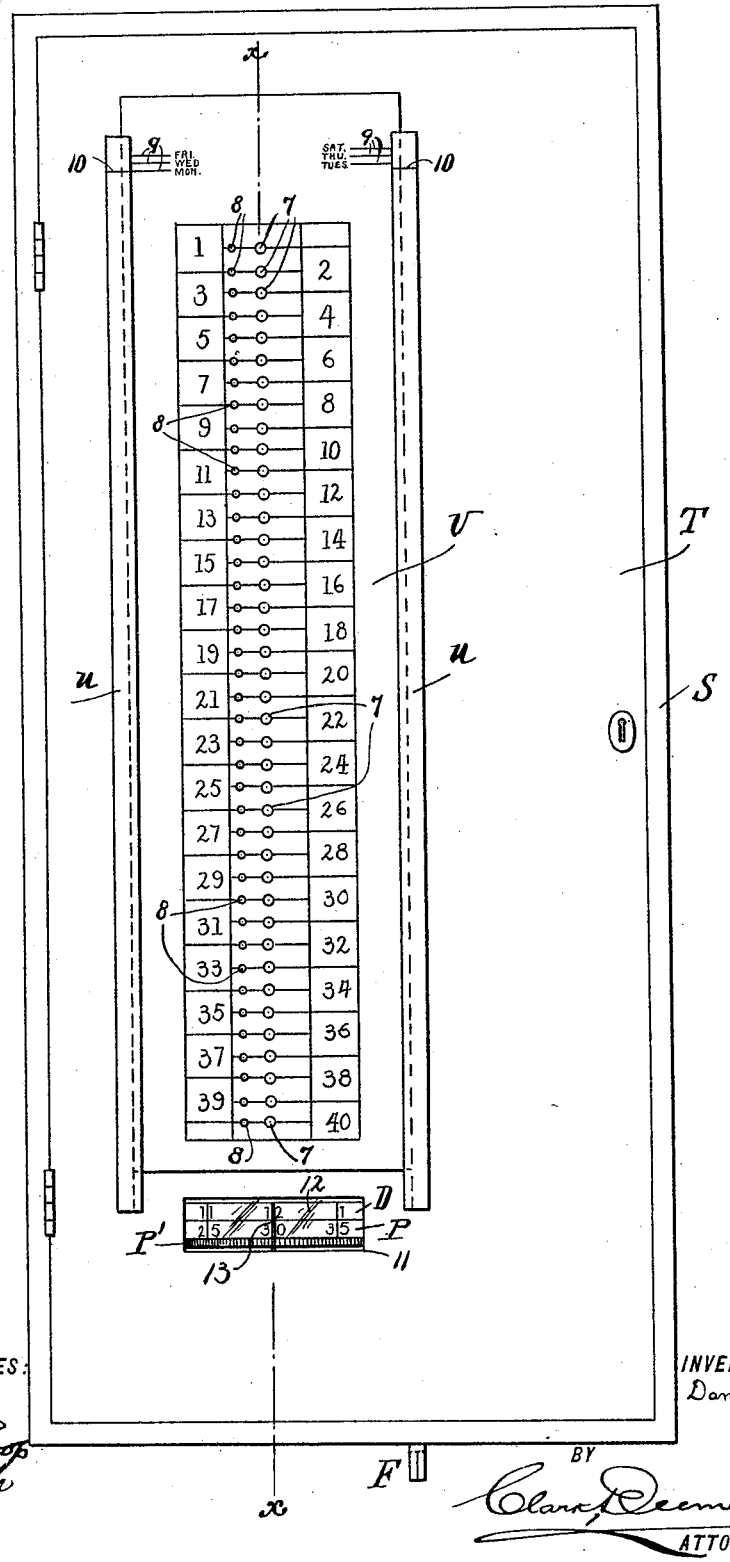
Figure 2:
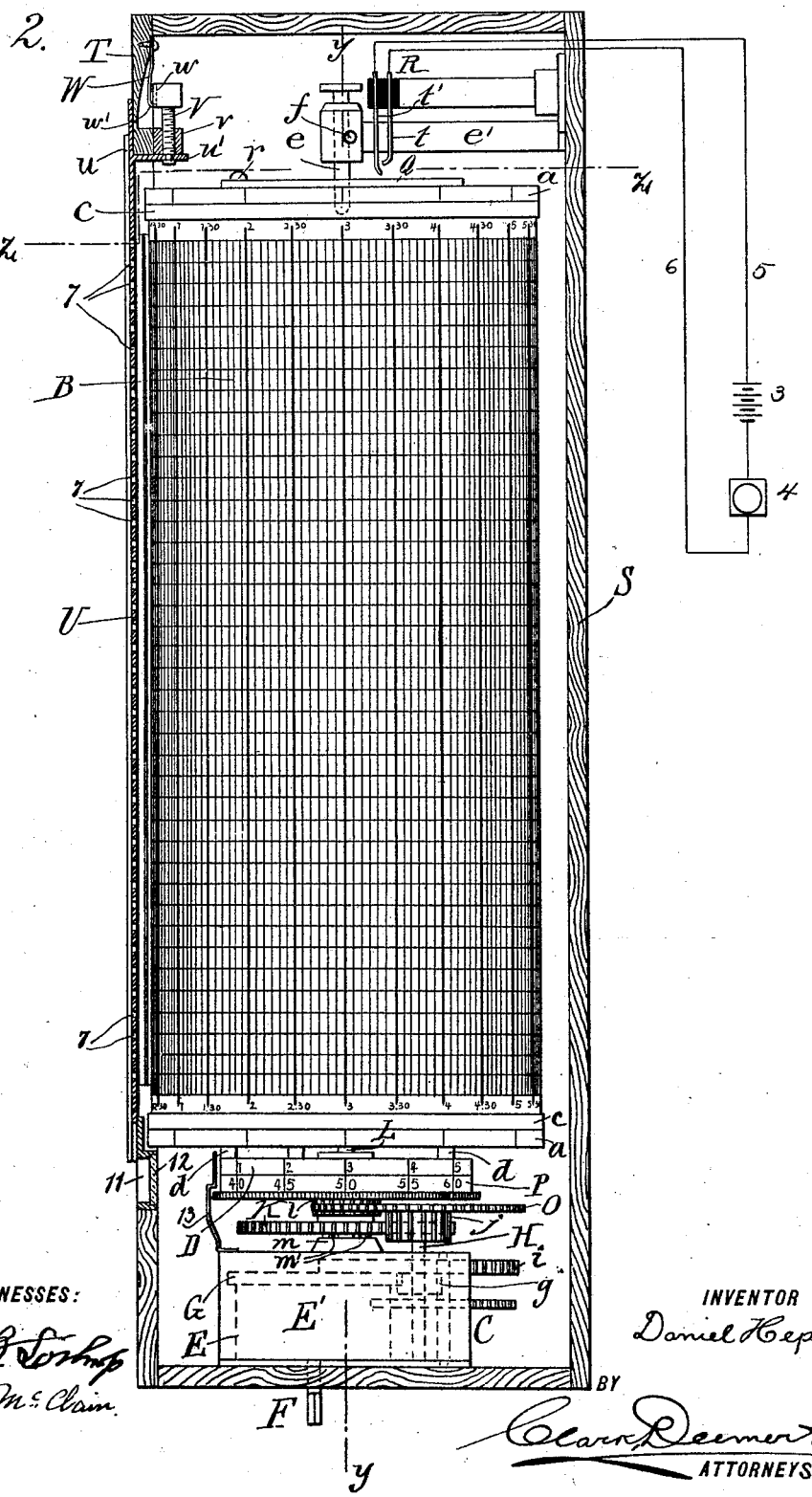
Figure 3:
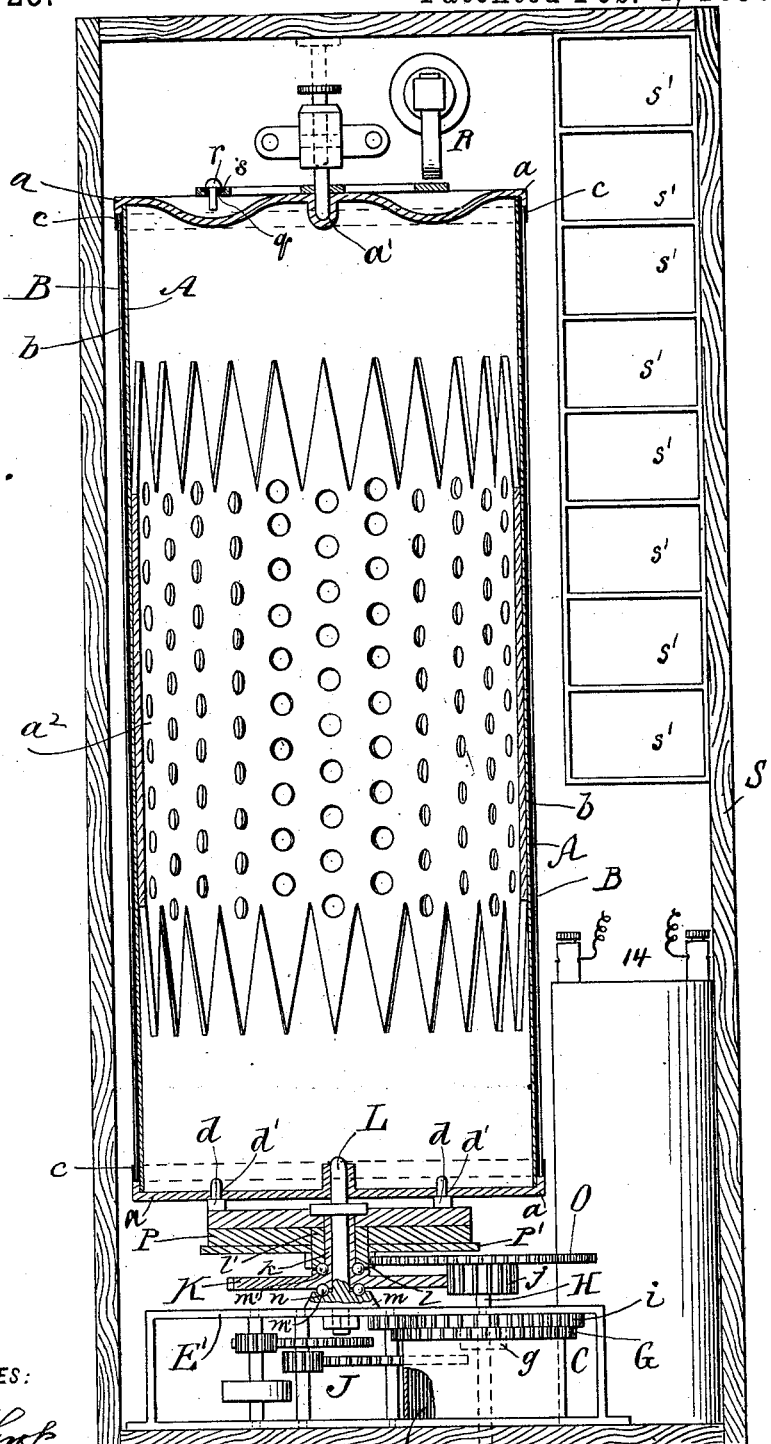
Figure 4:
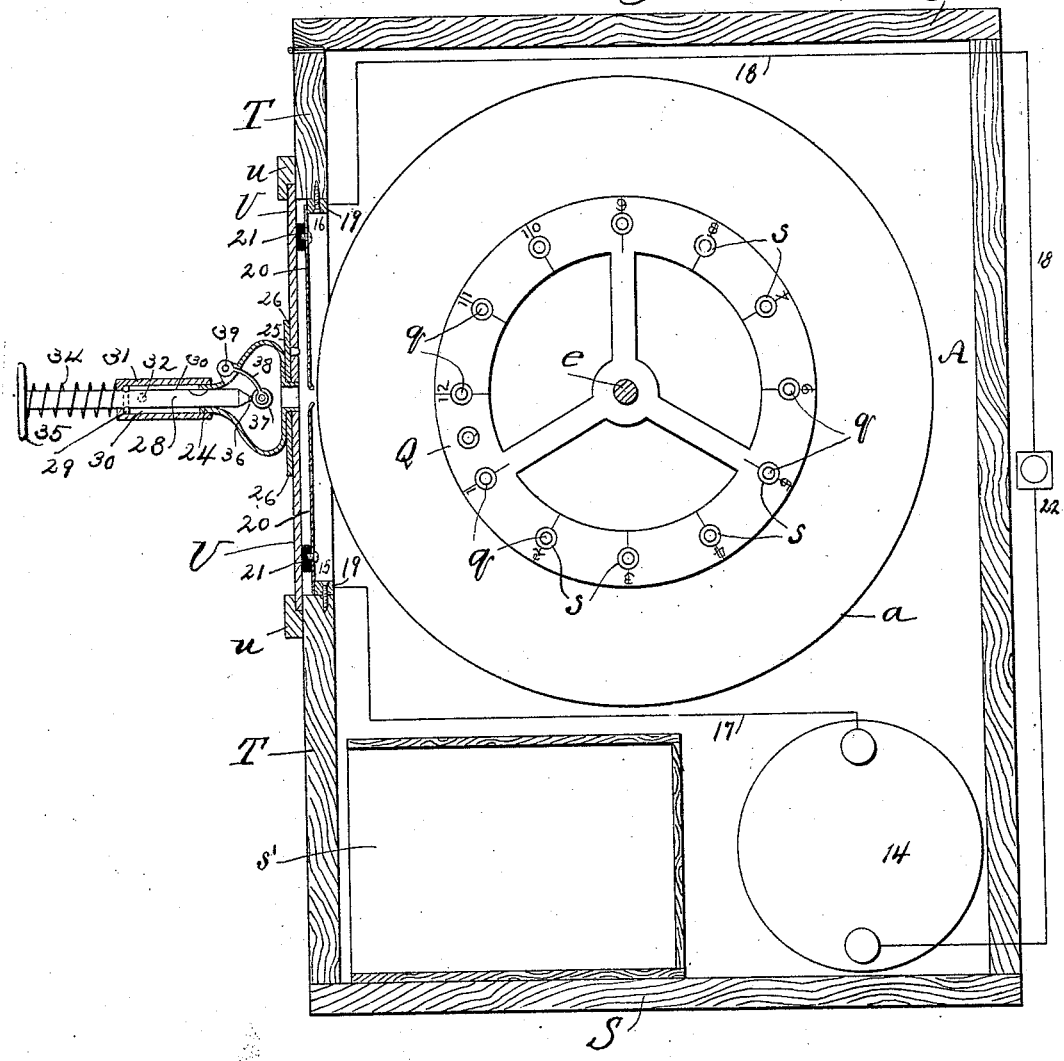

In the accompanying drawings, Figure 1 is a front elevation of my apparatus. Fig. 2 is a sectional elevation taken on a line $x\ x$ of Fig. 1. Fig. 3 is a sectional elevation taken on a line $y\ y$ of Fig. 2. Fig. 4 is a sectional plan taken on a line $z\ z$ of Fig. 2. Fig. $5^a$ is a view of a portion of a time-sheet adapted for use in the operation of my device. Fig. $5^b$ represents the other portion of the said time-sheet which should be attached to Fig. $5^a$ at the broken lines 1 1 and 2 2. Fig. 6 is a view in blank showing the method of constructing a portion of the key which will be used in connection with the operation of my device. Fig. 7 is a disassembled view in perspective of the several parts of the said key.

In the practice of my invention a sheet-metal cylinder A is employed to carry the time-sheet B. The said cylinder has two heads or caps $a$ secured to its respective ends and a sheet of rubber $b$ or other pliable material surrounding it and covering its entire outer surface. Said cylinder may be strengthened by an auxiliary cylinder $a^2$. The said coating of rubber is adapted to take the impact of the recording-keys when the device is being operated. Around this outer coating of rubber the time-sheet B is wrapped, and this said time-sheet will be of a length sufficient to make the lines 9 9 thereon register with each other, care being taken when adjusting the said sheet to the cylinder to place the end thereof bearing the names of employés underneath, thus producing a continuous surface with vertical lines thereon indicating the hours and minutes.

The time-sheet B will be secured to the cylinder A by rubber bands $c$ or by any other suitable fastener. Having properly adjusted the time-sheet upon the cylinder and registered it with the hour-marks on the periphery of the lower cap thereof the cylinder is adjusted to the clockwork C by means of pins $d$ which are mounted upon the hour-disk D of the said clockwork C. These pins $d$ are placed on an eccentrically-arranged line on the upper surface of the disk D and are adapted to engage with similar eccentrically-arranged apertures $d'$ in the lower cap, $a$, of the cylinder A, which arrangement assures that the cylinder will always be placed in proper position in relation to the clockwork.

After adjusting the cylinder in the manner above described in a vertical position over the clockwork to further secure and afford a bearing for its upper cap or head, a socket $a'$ is formed therein adapted to engage with a vertically-movable pin $e$. This said pin engages with a horizontal bracket $e'$ and is held in place therein by means of a rubber or other flexible plug $f$ which passes through the outer end of the bracket $e'$. By the use of this plug it will be seen that the pin can be maintained in the position shown in dotted lines in Fig. 3 when it is desired to remove the cylinder.

In the clockwork an ordinary barrel or main spring E is supplied and attached to a square-headed spindle F by any suitable ratchet-and-pawl mechanism in the usual manner, and the spindle extends beyond the casing or box which confines the clockwork for convenience in winding. A spur-wheel G is given rotary motion direct from the spring E, which is communicated to a pinion $g$ upon a shaft or spindle H, which also has mounted thereon a spur-wheel $i$ which communicates with an ordinary train of gearing J, which is common to all clockwork. The shaft H also has mounted upon it a pinion *j* which gears with the spur-wheel K. This said spur-wheel is loosely mounted upon a spindle L, which is rigidly secured to a frame E' of the clock-work.

The hub *k* of the wheel K extends upwardly and has secured to its upper end a disk D, which said disk has marked on its outer periphery the hours, numbered from one to twelve. Loosely mounted upon the hub *k* of the spur-wheel K and adapted to revolve independently thereof is a pinion *l*. This said pinion is given a rotary motion through the medium of the gear-wheel O, which is attached to the shaft H. Securely mounted upon the hub *l'* of the pinion *l* is a disk P, which said disk has marked on its outer periphery the minutes corresponding to the dial of a clock from one to sixty. Secured to this disk P is another disk P', which has a milled edge and is of a diameter larger than that of the disk P. This disk P' can be used in lieu of the minute-hand when it is desired to set the clock.

In order to supply a secure bearing for the gear-wheel K and to reduce its friction to a minimum, the spindle *l* is supplied with a collar *m*, which said collar has an annular groove *n* in its upper surface adapted to receive balls *m'*, upon which the said gear-wheel K is mounted.

The hub *k* of the gear-wheel K also has an annular groove in its surface adapted to receive similar balls upon which is mounted the pinion *l*.

Upon the cap or head *a* of the cylinder A is placed a ring Q. This said ring has radial marks thereon adapted to indicate the hours, which said marks may be made to register with the hour-marks on the outer periphery of the cap *a* of the cylinder A. The ring is further provided with apertures *q* adapted to engage the pin *r*, which must be insulated from the ring by insulating material *s*. By the use of this pin a bell or other indicating device may be automatically sounded or operated at any desired distance from the apparatus by means of a contact-making device R. This device is composed of two spring-plates *t* and *t'*, which are normally out of contact, as shown in Fig. 2, and are connected to a battery 3 and a bell 4 by means of wires 5 and 6. The cylinder being given a continuous rotary motion, the pin *r* in passing under the plate *t'* forces it in contact with the plate *t*, whereby the bell 4 or other electrical indicator will be operated.

Surrounding the cylinder and the other mechanism is a box or casing S, which said box is supplied in its front portion with a door T. Upon this door is mounted a perforated plate U. This plate is held in place by means of angular strips or guides *u*. At the upper end of the plate U, extending inwardly, is a projection *u'* which engages with an adjusting-screw V. This adjusting-screw passes through and meshes with a nut *v*, which is securely attached to the door T. In the head of this screw is cut a vertical slot *w*, which engages with the tongue *w'* of the spring W, which is securely fastened to the door T. The plate U is supplied on a vertical line through its center with a series of perforations 7, through which a key may be inserted when the device is being used. The plate U is further provided with another row of perforations 8 and a series of numbers adapted to indicate the number of employés, the use of which will be hereinafter more fully described. On the upper face of the plate U are placed six registering marks 9, three on each side thereof. These lines are adapted to register with other lines, 10, upon the strips *u*, and they will indicate the day of the week upon which the device is to be used.

Cut through the lower portion of the door T is an aperture 11, which is covered by a glass plate 12. Through this opening the disks D and P are visible. Therefore the time of the day can always be designated by reference thereto.

In order to enable the device to show the exact time, a pointer 13 may be supplied, which must be placed in front of the disks D and P directly in the center thereof, as illustrated in Figs. 1 and 2.

Within the box or casing may be placed a battery 14, the two poles of which will connect with the contact-making devices 15 and 16 by means of wires 17 and 18. These contact-making devices comprise metallic blocks 19 and sliding plates 20, the blocks 19 being mounted upon the door T and the plates 20 upon the sliding plate U, being insulated therefrom by means of insulating-blocks 21. In electrical connection with the battery 14 may be placed a bell or other indicating device 22, which will be electrically operated every time a key is inserted through the plate U, as will be hereinafter fully described.

The key used in the operation of my device is made by punching out of a piece of sheet metal a blank 23, as illustrated in Fig. 6. This said blank is formed into the shape illustrated in perspective at 24, Fig. 7, and the foot-plate 25, having points 26 thereon, is attached by means of bendable lips 27. The other parts of the key are then assembled, the spindle 28 thereof being inverted and placed within the cylinder 24. Its pin 29 will engage with the slots 30 of the said cylinder and prevent rotary motion therein. The cap 31 will then be forced on the said cylinder and its inwardly-projecting lugs 32 will engage indentations 33 in the cylinder 24. Thus the movement of the spindle 28 will be limited to the length of the slot 30. The spring 34 will surround the spindle 28 and bear against the top of the cap 31 and the circular head 35, which must be securely attached to the upper end of the spindle 28. Thus the said spindle will be maintained normally in position, as shown in Fig. 4. The spindle 28 has on its outer end an indicating-character 36, adapted to record the day upon which it is to be used. Having assembled the spindle with the other portions of the key, an inking-roll 37 is mounted on a spring 38 and is inserted between the two lugs 40, and securely attached thereto by means of a bolt 39. The foot-plate 25 of the key 24 has an outwardly-projecting lug 41, adapted to engage with apertures 8 of the sliding plate U when it is in use. A tubular projection 42 is also provided upon the key, which engages with the apertures 7. These apertures 7 and 8 being in exact horizontal alignment with each other cause the letter or numeral upon the spindle 28 to enter through the plate U in proper alignment, whereby the said letter or numeral will always be printed in an upright position and on a horizontal line.

In practice I will supply twelve keys, six of which will have supplied thereon the letters in raised type "M," "T," "W," "R," "F" and "S" and the other six the numerals "1," "2," "3," "4," "5," "6." I use the letter "R" to designate "Thursday" to distinguish it from the letter "T," which designates "Tuesday." These keys are used, one set for the arrival and the other set for the departure of employés, and I have supplied within the box S compartments $s'$ adapted to contain the said keys when they are not in use.

In the operation of my device, the cylinder being properly set, the door T is closed, having first properly adjusted the sliding plate U. In the drawings this plate is shown as adjusted for use on a Monday—that is, it is in its greatest upward position and the line 9 opposite to the word "Monday" is exactly registered with the line 10. If it is desired to set the machine for Tuesday, for instance, the spring W will be forced out of engagement with the slot $w$ of the screw V and the said screw will be given one revolution. The spring W then being allowed to come in engagement therewith, again holds it in position until it is desired to set the plate for the next day.

The threads upon the screw V and upon the inner surface of the nut $v$ are so cut as to allow the plate to vertically move only to the extent of one-sixth of the distance between the horizontal lines indicated upon the time sheet for every revolution of the screw. As the workmen come into the factory or other place where the time-recorder may be in use—upon a Monday morning, for instance—they are given a key bearing the letter "M." These said workmen or operatives are designated by numbers from one to forty, or the machine may be constructed to operate for a larger or smaller number of employés.

As an illustration: When No. 2 comes to his place of business on a Monday morning, he takes the key and inserts it through the aperture 7 opposite the number "2" of the plate U, and stamps the letter "M" upon the face of the time-sheet B. The vertical lines on the said sheet will indicate the exact hour or minute of his arrival and the letter will be stamped on the extreme upper portion of the space between the two horizontal lines set apart for No. 2. In the evening as he leaves his place of business a key bearing the numeral "1" will be given him and he again stamps an impression upon the sheet B. This will indicate the exact hour and minute of his departure, and the first and second impressions of that day will be on an exact horizontal line. On the next day the plate U will be moved down one space and the same operation repeated.

In the act of stamping a numeral or letter upon the face of the cylinder the spindle 28 will force back the inking-roll 37, which is held normally in contact with the type 36 upon the said spindle by means of the spring to which it is attached. This said spring and its inking-roll may be removed at any time by the removal of the bolt 39 which secures it.

When the impression is made upon the time-sheet B by the type 36 of the spindle 28, an electrical connection between the two plates 20 of the contact-making devices 15 and 16 is also effected by means of the spindle 28 coming in contact with the two plates 20, as it passes between the space separating them. This will complete the circuit which must pass through the bell or other indicating device 22, whereby it will be sounded or otherwise indicated at the time of the arrival or departure of the employé using the key. This bell or other indicator may be placed at any desired distance from the apparatus.

Having thus fully described my invention, what I claim as new, and desire to secure by Letters Patent, is—

1. In a time-recorder, the combination with a clock mechanism having in lieu of the customary hour and minute hands, two revoluble disks which have indicating-marks upon their respective peripheries, and are mounted independently of each other upon a vertical spindle and ball-bearing, the upper or hour-indicating disk being connected with a spur-wheel, and the lower or minute disk with a pinion, said wheel and pinion gearing respectively with a pinion and spur wheel of the clockwork; with a revoluble cylinder having a time-sheet thereon, said cylinder adapted to be adjusted to the upper disk of the clockwork by means of pins forming part thereof, which engage with apertures in the lower head of the cylinder, the cylinder being also supplied in its upper head or cap, with a socket, adapted to engage with a vertically-movable pin, which forms its upper bearing, and an indicating-ring with insulated apertures therein, adapted to receive pins which will automatically make electrical connections between two plates of a contact-making device; and a housing or casing supplied with a door which has a sliding perforated plate adjustably mounted thereon, said plate to be adjusted by means of a screw having a slot which is in normal engagement with a spring, said plate being adapted to receive a self-inking recording-key, said key being adapted to simultaneously impress a character upon the record-sheet of the revoluble cylinder, and operate a bell or other signal which is connected with a battery within the box or casing, substantially as shown and described.

2. A time-recorder, comprising a housing or casing which is supplied with a door having a sliding apertured plate adjustably mounted thereon, said plate being adapted to engage with a self-inking recording-key, and a revoluble cylinder having a time-sheet upon its annular face, apertures through its lower head, and a socket in and an indicating-ring upon its upper head, said indicating-ring being supplied with insulated apertures which engage with removable pins, which pins are adapted to make electrical connection between the two plates of a contact-making device, and which socket engages with a vertically-movable pin, and a clockwork comprising two revoluble disks having indicating-marks upon their respective peripheries and being mounted independently of each other upon a vertical spindle and ball-bearings, the upper or hour disk having pins projecting from its upper surface which engage with the apertures of the lower head of the cylinder and a spur-wheel connected to its hub, and the lower disk being connected to a pinion, said spur-wheel and pinion gearing with a pinion and spur-wheel of a train of gearing which is operated by a mainspring; substantially as shown and described.

3. The combination of a casing or housing, having a door therein upon which is mounted a vertically-adjustable perforated plate which is adjusted by means of a screw having a slot in the head thereof, which slot is in normal engagement with a spring and which plate is adapted to engage with a reciprocating self-inking recording-key; with a clockwork and a revoluble cylinder, the clockwork comprising two disks having hour and minute marks indicated upon their peripheries and a train of gearing adapted to be operated by a spring, and a cylinder comprising two heads and an annular wall carrying a time-sheet, the lower head thereof being secured to one of the said disks and the upper head being provided with a socket and a ring having insulated apertures and pins therein, adapted respectively to engage with a vertically-movable pin and to automatically connect the two poles of a contact-making device, whereby a bell is sounded; substantially as shown and described.

In testimony that I claim the foregoing as my invention I have signed my name, in presence of two witnesses, this 31st day of May, 1895.

DANIEL HEPP.

Witnesses:
CHAS. LIESEKE,
EDW. HENDRICKSON.